US007230649B2

(12) United States Patent
Takahashi et al.

(10) Patent No.: US 7,230,649 B2
(45) Date of Patent: Jun. 12, 2007

(54) IMAGE SENSOR SYSTEM USING CMOS IMAGE SENSOR AND IMAGE SENSOR APPARATUS USING CMOS IMAGE SENSOR

(75) Inventors: Takashi Takahashi, Takasaki (JP);
Hiroyuki Matsumoto, Takasaki (JP);
Teruyuki Odaka, Takasaki (JP);
Masashi Nakamura, Takasaki (JP);
Koji Shida, Takasaki (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 1122 days.

(21) Appl. No.: 10/291,531

(22) Filed: Nov. 12, 2002

(65) Prior Publication Data
US 2003/0107659 A1 Jun. 12, 2003

(30) Foreign Application Priority Data
Dec. 11, 2001 (JP) ............................. 2001-376668

(51) Int. Cl.
*H04N 5/225* (2006.01)
*H04N 3/14* (2006.01)
*H04N 5/335* (2006.01)
*G06F 1/00* (2006.01)

(52) U.S. Cl. ...................... 348/372; 348/312; 348/307; 713/501

(58) Field of Classification Search ............. 348/222.1, 348/372, 294, 312, 302, 304, 307
See application file for complete search history.

(56) References Cited

U.S. PATENT DOCUMENTS 4,686,571 A * 8/1987 Suzuki .................... 348/230.1

(Continued)

FOREIGN PATENT DOCUMENTS

JP 2005191843 A * 7/2005

(Continued)

OTHER PUBLICATIONS

Yamashina et al.; "A Microprogrammable Real-Time Video Signal Processor (VSP) LSI"; Dec. 1987; IEEE Journal of Solid_State Circuits, vol. SC-22, No. 6; pp. 1117-1123.*

(Continued)

*Primary Examiner*—John M. Villecco
(74) *Attorney, Agent, or Firm*—Miles & Stockbridge PC

(57) ABSTRACT

An image sensor such as the conventional CMOS image sensor, in which automatic controls including so-called automatic iris control and white balance adjustment for adjusting the sensor sensitivity, namely the charge accumulation time in each pixel, according to the brightness of the image sensing ambience are performed, involves the problem that, when the frame rate of the image sensor is slowed to save power consumption, the operation of the automatic control systems will also become slower and the image quality deteriorates. In the invented image sensor system using a CMOS image sensor, while a CMOS image sensor is operated at the full frame rate all the time, a circuit for processing image signals from the CMOS image sensor is operated at a speed close to that of full frame processing only when the power supply is turned on or when the image sensing ambience varies and switched to a lower frame processing speed when automatic controls, including iris control, have become stabilized.

13 Claims, 6 Drawing Sheets

U.S. PATENT DOCUMENTS

| | | | |
|---|---|---|---|
| 5,206,730 A * | 4/1993 | Sakai | 348/220.1 |
| 5,523,786 A * | 6/1996 | Parulski | 348/237 |
| 5,539,455 A * | 7/1996 | Makioka | 348/222.1 |
| 5,581,297 A * | 12/1996 | Koz et al. | 348/153 |
| 6,377,301 B1 * | 4/2002 | Hieda | 348/231.99 |
| 6,867,803 B1 * | 3/2005 | Funamoto | 348/312 |
| 6,900,832 B1 * | 5/2005 | Yano | 348/222.1 |
| 6,963,373 B2 * | 11/2005 | Imaizumi | 348/312 |
| 7,006,133 B1 * | 2/2006 | Hayashi | 348/222.1 |
| 7,129,985 B1 * | 10/2006 | Koizumi et al. | 348/308 |
| 2001/0043270 A1 * | 11/2001 | Lourie et al. | 348/222 |
| 2002/0154225 A1 * | 10/2002 | Matsumoto et al. | 348/229.1 |
| 2004/0233324 A1 * | 11/2004 | Galambos et al. | 348/372 |
| 2006/0186315 A1 * | 8/2006 | Lee et al. | 250/208.1 |
| 2006/0262200 A1 * | 11/2006 | Kondou | 348/231.99 |

FOREIGN PATENT DOCUMENTS

JP      2005303673 A  * 10/2005

OTHER PUBLICATIONS

Kiriyama et al; "Low-Power Design for Real-Time Image Segmentation LSI and Compact Digital CMOS Implementation"; 2004 IEEE Asia-Pacific Conference on Advanced System Integrated Circuits; Aug. 4-5, 2004.*

* cited by examiner

IMAGE SENSOR SYSTEM USING CMOS IMAGE SENSOR AND IMAGE SENSOR APPARATUS USING CMOS IMAGE SENSOR

BACKGROUND OF THE INVENTION

The present invention relates to a technique that can be effectively applied to an image sensor system using a CMOS image sensor and is intended to reduce power consumption by slowing the speed of image frame processing, for instance a technique that can be effectively applied to camera functions to be mounted on a portable electronic apparatus having a function for communication, such as a mobile telephone.

Image sensors for use in digital cameras, such as video cameras and electronic still cameras, include CCD image sensors and CMOS image sensors. Of these two types, the CMOS image sensor has the advantage of consuming less power than CCD image sensors and therefore suitable for smaller and lighter digital cameras. The CCD image sensor, after transferring in parallel all the accumulated electric charges resulting from the photoelectric conversion of pixels one by one to a transferring CCD at the same timing for all pixels, outputs them within that transferring CCD in series. In order to make the charge transfer efficiency within the CCD high, a generation of a wide difference in potential is required. This invites an increase in power consumption.

On the other hand, the CMOS image sensor converts, on a pixel-by-pixel basis, accumulated electric charges resulting from the photoelectric conversion of pixels one by one into voltages, amplifies the converted voltages, and selects and reads them out consecutively with a matrix selection circuit pixel by pixel. This system can work on a single power source of no more than, for instance, +3.3 V, and its power consumption can be reduced to only a small proportion of that of the CCD image sensor. Furthermore, as CMOS elements can be manufactured by a CMOS process, peripheral circuits including amplifiers and A/D converters can be integrated together, and therefore the number of parts can be reduced.

Because of these advantages, CMOS image sensor-based camera systems have come to find use in recent years where the requirement for small size and light weight is especially keen, such as mobile telephones and mobile data terminals. CMOS image sensors have also come to be used in video camera systems of various types including that of the National Television System Committee (NTSC). To meet these needs, CMOS image sensors with an electronic shutter release function in which peripheral circuits including amplifiers and A/D converters are integrated and the duration of accumulation of electric charges of pixels can be set from outside on a frame-by-frame basis have become available in the market.

SUMMARY OF THE INVENTION

When a camera system using a image sensor is to be used in a mobile telephone or the like, a CMOS image sensor is frequently used on account of the keen requirement for smaller power consumption. Furthermore, it is difficult for a mobile telephone to transfer moving images because of the constraint of the data transfer rate. To consider a case of transferring image data by a telephone of the wide band code division multiple access (WCDMA) system at a transfer rate of 384 Kbps for instance, even if the data are compressed by the compression system known as MPEG4, at most five or six frames can be transferred per second, but it is impossible to transfer full 30 frames per second (30 fps).

Therefore, the image sensor also need not output data for anymore than five or six frames per second to match the transfer rate. Then, it is conceivable to reduce the number of frames by lowering the operational frequency of the camera system. As this can reduce the power consumption by the image sensor and the signal processing circuit, curtailment of the number of frames is an effective approach to apparatuses with a keen requirement for power saving, such as a mobile telephone.

However, in an image sensor such as a CMOS image sensor, the iris, white balance and other factors are automatically controlled to regulate the sensitivity of the sensor, namely, the duration of electric charge accumulation in each pixel. This results in the problem that, if the frame rate of data transfers from the image sensor is low, the automatic control systems are also slow to operate, inviting a deterioration in image quality.

An object of the present invention, attempted in view of the problem noted above, is to provide a technique for making it possible to reduce the power consumption by an image sensor system using a CMOS image sensor without adversely affecting the image quality by lowering the frame processing speed.

Another object of the invention is to provide a suitable image sensor system for adding a camera function to a mobile electronic apparatus operating on a battery, such as a mobile telephone.

The above-described and other objects and features of the present invention will become apparent from the description in this specification when taken in conjunction with the accompanying drawings.

What follows is a brief summary of a typical aspect of the invention disclosed in this application.

Thus, in an image sensor system using a CMOS image sensor according to the invention, while the CMOS image sensor is operated at the full frame rate all the time, a circuit for processing image signals from the CMOS image sensor is operated at a speed close to that of full frame processing only when the power supply is turned on or when the image sensing ambience varies and switched to a lower frame processing speed when automatic controls, including iris control, have become stabilized. In this way, power consumption can be reduced without adversely affecting image quality.

Generally applicable systems conceivable for reducing the number of frames while keeping the responsiveness of automatic controls include a system by which the image sensor is operated at its usual operational frequency to provide its output at the full frame rate and, after once storing the resultant frame data into a memory, a required number of frames of data are read out and processed. However, since this system newly requires a memory, it involves an additional cost, and moreover as this memory operates at the full frame rate to match the operating speed of the image sensor, the total power consumption cannot be sufficiently reduced.

By contrast, if the present invention is applied, as the CMOS image sensor is operated at the full frame rate, such as 15 fps, when the power supply is turned on or when the image sensing ambience varies, automatic controls including iris control converge in 0.5 second or so, and by operating the sensor after that at a low rate of 3 to 7.5 fps, for instance, the power consumption can be reduced to somewhere between ½ and ⅕ of that during normal operation. On the other hand, since human operation of a camera usually takes a few seconds to dozens of seconds at a time and therefore the image sensing ambience varies at intervals of a few seconds to dozens of seconds, presumably longer than the 0.5 second taken by automatic control by 10 times or even more, the total power consumption can be substantially reduced without sacrificing the image quality required of the camera. Furthermore, because no additional device such as a memory is needed, not only the consumption of power by the memory is absent but also there is no addition to the hardware cost.

Conceivable methods for reducing the frame processing speed of the circuit for processing image signals include one of providing on the same semiconductor chip as the image signal processing circuit a frequency divider circuit capable of dividing the frequency of a reference clock signal into a plurality of steps and reducing the frequency of the operational clock of the image signal processing circuit by varying the frequency division ratio of that frequency divider circuit. As the operational clock for the CMOS image sensor, the reference clock of the frequency divider circuit is supplied. This facilitates synchronization between the CMOS image sensor and the image signal processing circuit.

Further according to the invention, besides operating the CMOS image sensor at its normal rate when the power supply is turned on or when the image sensing ambience varies, the circuit for processing image signals from the CMOS image sensor is operated at a speed matching the same frame rate as that of the image sensor and, when the illuminance of the object is low and the image sensing ambience varies a little, the CMOS image sensor is operated at a lower frame rate than the normal, with the frame processing speed of the image signal processing circuit also being switched to a lower rate. This makes it possible to keep the duration of accumulation of electric charges of pixels longer than the period of time taken by a full round of scanning all the horizontal scanning lines, and thereby to provide bright enough images.

DESCRIPTION OF THE PREFERRED EMBODIMENT

Figure 1:
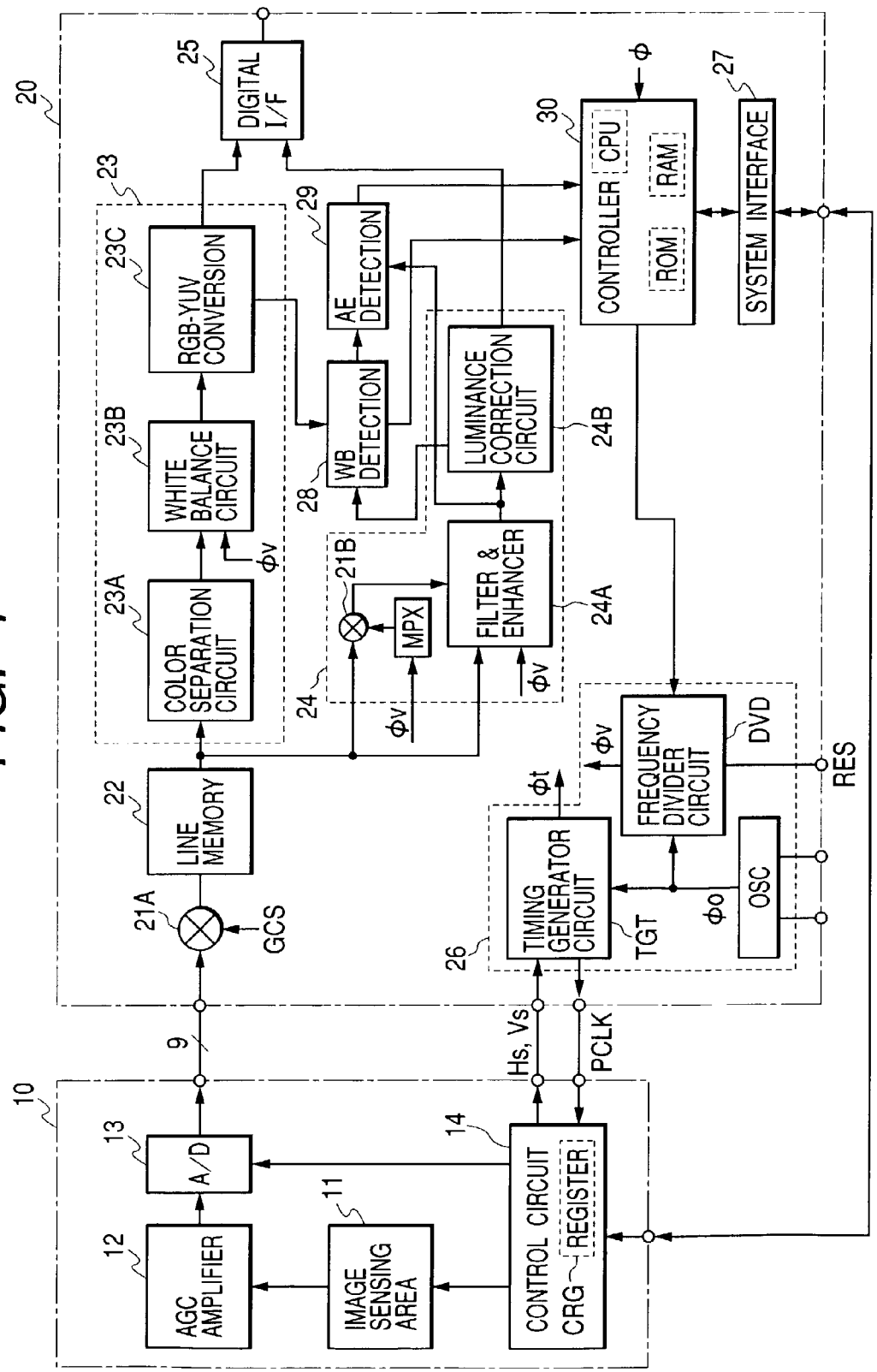
FIG. 1 is a block diagram illustrating an image sensor system using a CMOS image sensor, which is a preferred embodiment of the present invention.

FIG. 1 is a block diagram illustrating an example of camera system for a CMOS image sensor to which a technique according to the present invention is applied. The camera system illustrated here comprises a CMOS image sensor 10, a signal processing circuit 20 for processing image signals from the image sensor 10, and a controller 30 for controlling the whole system among other elements.

The CMOS image sensor 10 is formed by integrating over a semiconductor substrate an image sensing area 11 in which pixels each consisting of a photodiode and an amplifier circuit are arranged in a matrix, an analog type variable gain amplifier 12 for amplifying image signals outputted from the image sensing area 11, an A/D converter 13 for converting the amplified image signals into digital signals, a control circuit 14 for controlling the inside of elements and receiving set data of the charge accumulation time and other elements. The photodiodes and their peripheral circuits are formed by a known CMOS semiconductor process.

The control circuit 14 is provided, in an inside thereof, with a control register CRG for holding set data of the frequency of the operational clock and the charge accumulation time (exposure time), and controls the inside of elements according to set data in this control register CRG.

The signal processing circuit 20 is provided with a digital gain control circuit 21A for amplifying image data inputted from the CMOS image sensor 10, a line memory 22 for holding a one-line equivalent of image data to clearly define the contour of the image, a color signal processing unit 23 and a luminance processing unit 24 for generating digital video signals (color signals and luminance signals) of the NTSC standard on the basis of pixel read signals from the image sensor 10, a digital interface (I/F) 25 for outputting the converted image signals to a display unit, such as a liquid crystal panel, and a clock generator circuit 26 for generating an internal clock signal $\phi v$ required within the signal processing circuit 20 and a clock signal PCLK to be supplied to the CMOS image sensor 10. The signal processing circuit 20 is also formed over the single semiconductor substrate by the known CMOS semiconductor process.

The color signal processing unit 23 comprises a color separation circuit 23A for separating input image data into data of three primary colors (RGB), a color adjusting circuit 23B for color adjustment of the separated color signals, including white balancing to correct the distorted white due to the image sensing ambience into the original white, and an RGB-YUV conversion circuit 23C for subjecting the RGB signals having undergone color adjustment to γ correction to convert them into YUV signals suitable for the display unit.

The luminance processing unit 24 comprises a filter & enhancer 24A for performing filter processing to extract luminance signals from the input image signals and processing to emphasize boundaries, and a black correcting circuit 24B for subjecting luminance level signals, that have been generated, to γ correction and white correction in a dark image sensing ambience.

This embodiment of the invention may also be provided with, upstream from the luminance processing unit 24 a second digital gain control circuit 21B for amplifying image data, though it is not absolutely necessary, and this digital gain control circuit 21B is so configured as to have gain control data switched by a multiplexer MPX controlled by the controller 30. These gain control data designate the transmission gain of the digital pixel read signals inputted from the image sensor 10.

The clock generator circuit 26 consists of an oscillator circuit OSC, a frequency divider circuit DVD for dividing the oscillation signal $\phi 0$ of the oscillator circuit OSC into ½, ¼, ⅛, 1/16 and so forth, and a timing generator circuit TGT for generating a reference clock signal PCLK on the basis of the oscillation signal $\phi 0$ from the oscillator circuit OSC to be supplied to the CMOS image sensor 10 and generating a timing signal φt on the basis of a horizontal sync signal Hs and a vertical sync signal Vs outputted from the CMOS image sensor 10 to be supplied to circuits within the signal processing circuit 20.

The oscillator circuit OSC has an external terminal to which a quartz oscillator or the like is connected, and is so configured that, when a system clock signal φc is inputted to this external terminal from outside to serve as a reference instead of an oscillator being connected, the clock generator circuit 26 generates an internal clock signal φv and a reference clock signal PCLK for the CMOS image sensor 10 on the basis of a clock signal φc. To the frequency divider circuit DVD can be inputted a reset signal RES from outside and, when the power supply is turned on or resetting occurs, a register for holding the frequency division ratio is reset to set the initial frequency division ratio to 1/2, so that a clock resulting from 1/2 frequency division of the clock signal φc is outputted as the internal clock signal φv.

The controller 30, besides controlling the operation of the signal processing circuit 20, sets the frequency division ratio for the frequency divider circuit DVD, and sets via a system interface (S-I/F) 27 the frequency of the operational clock for the control register CRG in the control circuit 14 of the CMOS image sensor 10 and the charge accumulation time (exposure time).

The system interface (S-I/F) 27 may be provided with a circuit which performs interfacing for controlling the sensor, interfacing for controlling EEPROM and interfacing for serial communication, such as RS232C, in addition to an interface (IIC-I/F) with the CMOS image sensor 10.

In this embodiment, there are provided a WB detection circuit 28 for detecting the quantity of white balance adjustment on the basis of white correction signals from the RGB-YUV conversion circuit 23C and the black correcting circuit 24B and an AE detection circuit 29 for detecting the quantity of luminance adjustment on the basis of luminance signals from the filter & enhancer 24A. The controller 30, on the basis of detection signals from these detection circuits 28 and 29, judges that there is no variation in image sensing ambience if the variation in the quantity of adjustment is small, and effects control so as to raise the frequency division ratio set in a register within the frequency divider circuit DVD to a higher ratio and to lower the frequency of the clock φv outputted from the frequency divider circuit DVD.

When the quantity of adjustment has varied greatly on the basis of detection signals from the detection circuits 28 and 29, the controller 30 judges that the image sensing ambience has varied, and effects control so as to alter the frequency division ratio in the register within the frequency divider circuit DVD to a lower ratio and to raise the frequency of the clock φV outputted from the frequency divider circuit DVD to its initial level.

When the frequency of the clock φv outputted from the frequency divider circuit DVD drops, the processing speeds of the color signal processing unit 23 and the luminance processing unit 24 operating in accordance with this clock φv become slower. As a result, when for instance image data are delivered from the CMOS image sensor 10 at a speed of 15 fps or so, the number of frames processed within the signal processing circuit 20 is reduced. When the frequency of the clock φv outputted from the frequency divider circuit DVD rises (returns to the initial level), as the processing speeds of the color signal processing unit 23 and the luminance processing unit 24 operating in accordance with this clock φV become slower, the number of frames processed within the signal processing circuit 20 is increased by processing all the image data delivered from the CMOS image sensor 10 at a speed of 15 fps or so, resulting in prompt execution of such controls as white balancing and luminance adjustment.

Incidentally, the controller 30 has a ROM and a RAM built into it, and is so configured that the processing to alter the frame processing speed as described above be carried out by executing a program stored in the ROM. In this embodiment, the controller 30 determines any variation in image sensing ambience on the basis of the detection signals from the WB detection circuit 28 and the AE detection circuit 29. However, since the luminance signals are more susceptible to the impact of any variation in ambience, it is also possible to judge variations image sensing ambience on the basis of the detection signal from the AE detection circuit 29 alone.

The controller 30 stores in its internal RAM for instance the detected values of the frame before being outputted from the WB detection circuit 28 and the AE detection circuit 29, compares them with the detected values of the next frame and, if the difference between them is found greater than a threshold stored in the ROM, judges that the image sensing ambience has varied. Where, for instance, the values detected by the WB detection circuit 28 and the AE detection circuit 29 are expressed in 32 bits, if ⅔ of them, i.e. the 24 less significant bits, have varied, the controller 30 can determine a variation in image sensing ambience.

In this embodiment, the controller 30 is so configured that it is integrated over a single semiconductor substrate together with the signal processing circuit 20 as a semiconductor integrated circuit (LSI), though its configuration is not confined to this. As the controller 30, what is similar in configuration to a single chip microcomputer consisting of memories such as a ROM and a RAM and a microprocessor (CPU) can be used.

Where the controller 30 and the signal processing circuit 20 are to be configured as a singe LSI, the controller 30 can be structured by using what is available as intellectual property (IP) data for instance. The IP data are designed as a single coherent circuit and stored in a database so that, when an LSI needing a circuit having the same function is to be developed, the already designed data can be read out of the database to be combined with other circuits to realize the desired function. The signal processing circuit 20 and the controller 30 can also be separate LSIs, though. In this case, a general purpose single chip microcomputer can be used as the controller 30.

Further, the CMOS image sensor 10, the signal processing circuit 20 and the controller 30 (single chip microcomputer) may be configured as a module mounted over a printed circuit board, for instance. In this case, the module may further have a lens mounted over the CMOS image sensor 10 to match the image sensing area. The modular configuration facilitates incorporation of the image sensing function into a mobile data terminal, such as a personal data assistant (PDA) or a mobile telephone, and contributes to reducing the size. Furthermore, integration of the signal processing circuit 20 and the controller 30 into a single LSI would make possible a further reduction in module size.

Figure 2:
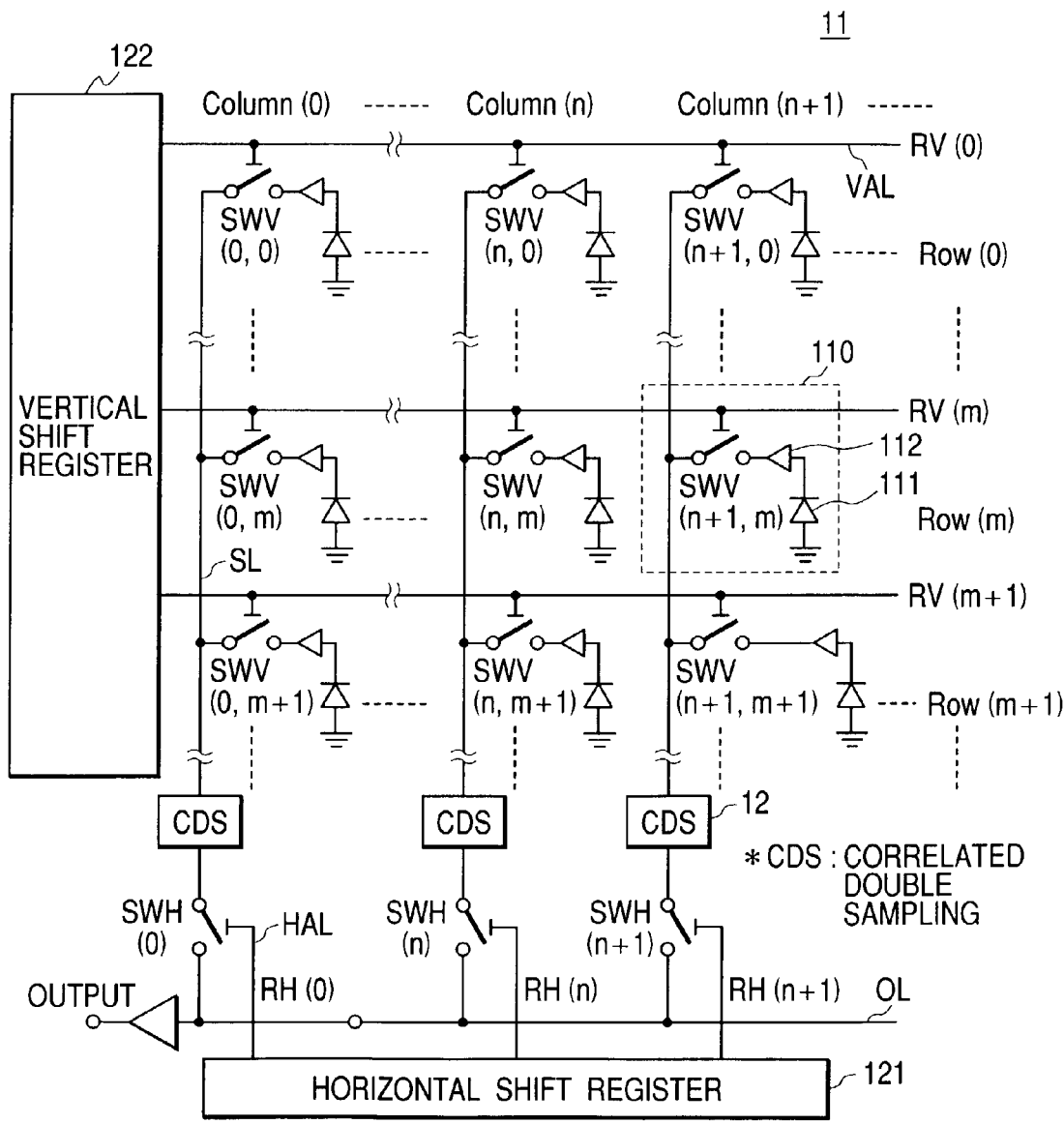
FIG. 2 is a circuit diagram partially illustrating the configuration of the image sensing area of the CMOS image sensor.

FIG. 2 illustrates a specific example of configuration of the image sensing area 11 within the image sensor 10. The image sensing area 11 is formed of many unit cells, or so-called pixels 110, arranged in a matrix of lines (horizontal) and columns (vertical). Each of the pixels 110 is formed of a photodiode 111, an amplifier circuit 112 and a selector switch SWV among other elements. As a horizontal transfer circuit (horizontal shift register) 121 and a vertical transfer circuit (vertical shift register) 122 perform on/off control over the selector switches SWV and SWH via a vertical address line VAL and a horizontal address line HAL, the electric charges accumulated in the pixels are sequentially read out one by one to an output line OL via a signal line SL. Correlated double sampling (CDS) is a circuit for sampling signals read out of a selected pixel 110 while removing noise.

Figure 3:
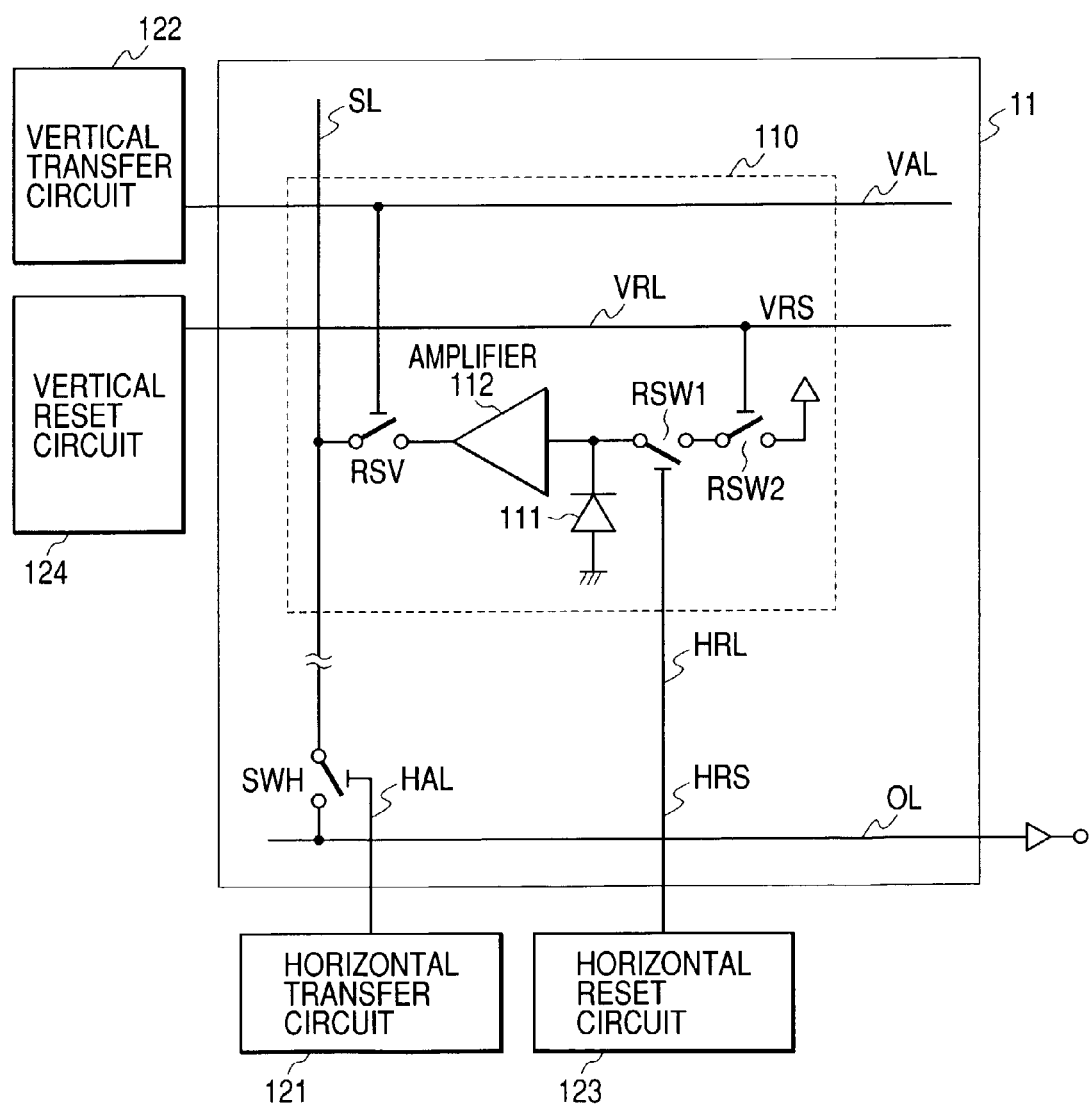
FIG. 3 is a circuit configuration diagram illustrating the internal configuration of a pixel in an enlarged view of a random pixel in the CMOS image sensor.

An individual pixel 110 in the image sensing area 11 is illustrated in more detail in FIG. 3. As shown in FIG. 3, in the image sensing area 11, a vertical reset line VRL and a horizontal reset line HRL are arranged in parallel with the vertical address line VAL and the horizontal address line HAL. To each of the pixels 110 are connected reset switches RSW1 and RSW2 in series between the accumulating node and the grounding point of the photodiode 111.

In reading out of each pixel 110, first a line is selected by the V address line VAL to turn on the switch SWV, and the charge accumulated in the pixel is outputted to the signal line SL. Then, a column is selected by the H address line HAL to turn on the switch SWH, and the signal read out onto the signal line SL is outputted via the output line OL. By sequentially repeating these actions, the charges accumulated in all the pixels of the image sensor are read out.

Upon completion of reading, the reset switches RSW1 and RSW2 are turned on by reset signals HRS and VRS from a horizontal reset circuit 123 and a vertical reset circuit 124 to discharge the electric charges accumulated in the photodiode 111. The period during which these reset switches RSW1 and RSW2 are turned off is the charge accumulation time of the photodiode PD. This on/off control of the reset switches RSW1 and RSW2 is carried out in synchronism with a vertical sync signal and a horizontal sync signal.

In the CMOS image sensor 10, the charge accumulation time is designated by setting from the external controller 30 into the control register CRG within the control circuit 14. The accumulation time is designated in terms of vertical transfer drive pulses for the sake of simplifying the counter circuit. Thus, by designating from outside the number of charge accumulating lines in terms of horizontal scanning lines, the charge accumulation time in each pixel is set.

The CMOS image sensor 10 of this embodiment has a master clock frequency of 12 MHz, and one pixel is read out in every six periods of the master clock, though not limited to these. Therefore, where the number of pixels per horizontal scanning line is 288, the charge accumulation time of 10 milliseconds is equivalent to 10 msec/(83.3 nsec×6×288) =69.4 horizontal scanning lines. Thus, by setting the number of charge accumulation lines to 70, the charge accumulation time of each pixel can be set to about 10 msec.

In the image sensor system of this embodiment, where the illuminance of the object is high and the maximum brightness that can be detected by the sensor is expressed in an eight bit code, if the decimal equivalent of brightness is 255 to 192, the brightness is adjusted by changing over the number of charge accumulation lines. Or where the illuminance of the object is dark and the decimal equivalent of brightness is 192 to 0, the brightness is adjusted by changing the signal amplification rate with the digital type gain control circuit 21A in the signal processing circuit 20 and the analog type gain control circuit 13 in the CMOS image sensor 10.

To add, even in this brightness range of 192 to 0, it is also possible to perform adjustment by the combined use of the change-over of the number of charge accumulation lines and gain control. Thus, it is possible to vary the accumulated charge quantity by changing over the number of charge accumulation lines stepwise by a large measure and linearly interpolating between the steps by gain control. It has to be noted that, in such a case, it is preferable to perform gain control with the digital type gain control circuit 21A, because discrete gain control matched with the change-over of the number of charge accumulation lines (entailing an abrupt change in gain) is apt to invite noise if accomplished with an analog circuit.

Figure 4:
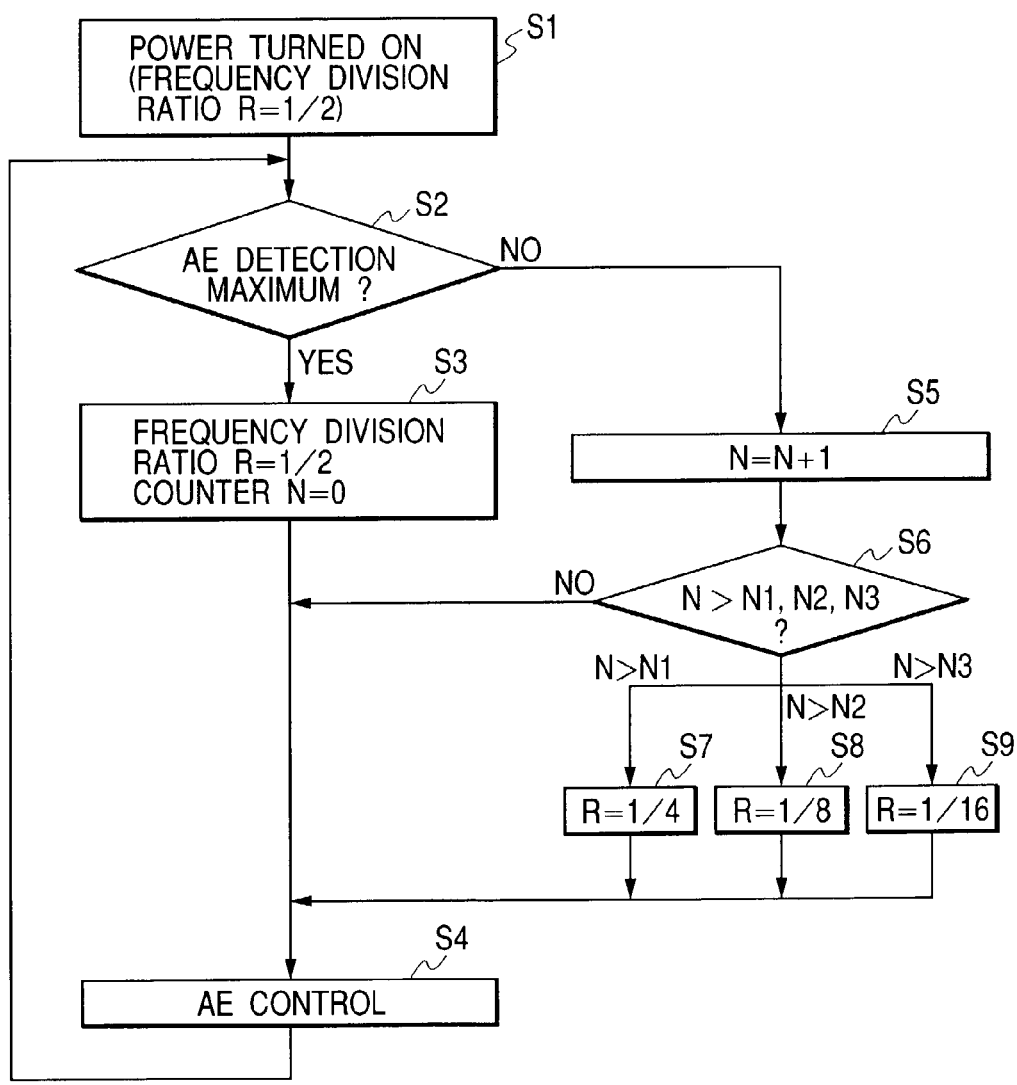
FIG. 4 is a flow chart of an example of clock frequency switching control in the image sensor system embodying the invention.

Next will be described an example of specific way of varying the frame processing speed with the controller 30 with reference to the flow chart of FIG. 4. Whereas the frame processing speed is varied on the basis of detection signals from the WB detection circuit 28 and the AE detection circuit 29, FIG. 4 shows the procedure of variation control based on the detection signal from the AE detection circuit 29.

First, as power supply to the system is actuated at step S1, the register in the frequency divider circuit DVD is reset by a power-on reset signal, the frequency division ratio R of the frequency divider circuit DVD is set to ½, and a clock φv of 6 MHz or so, resulting from the ½ frequency division of the oscillation signal φ0 of, for instance, 12 MHz generated by the oscillator circuit OSC is supplied to the controller 30, the color signal processing unit 23 and the luminance processing unit 24. The CMOS image sensor 10 is supplied with the oscillation signal φ0 of 12 MHz as it is as the reference clock PCLK. The frame processing speed at the time of the operation within the signal processing LSI with the clock φv of 6 MHz or so is the same as the number of frames outputted from the CMOS image sensor 10 per second, for instance, 15 fps.

When image signals from the CMOS image sensor 10 are inputted to the signal processing LSI, the color signal processing unit 23 and the luminance processing unit 24 process the signals, and the WB detection circuit 28 and the AE detection circuit 29 start detecting the quantity of white balance adjustment and that of luminance adjustment in the color signal processing unit 23 and the luminance processing unit 24. The controller 30 checks the detection signal from the AE detection circuit 29, and determines whether or not the detection signal has varied beyond a prescribed level (step S2).

If the detection signal is determined here to have varied beyond the prescribed level, the sequence proceeds to step S3 and, after setting the frequency division ratio R of the frequency divider circuit DVD to ½ and the count N of a timer counter to "0", automatic iris control is performed (step S4). This automatic iris control includes gain adjustment of the digital gain control circuits 21A and 21B and the setting of the charge accumulation time (exposure time) in the CMOS image sensor 10. Upon completion of the automatic iris control, the sequence returns to step S2.

On the other hand, if the detection signal from the AE detection circuit 29 is determined not to have varied beyond the prescribed level at step S2, the sequence proceeds to step S5 to increment the count N of the timer counter by +1. At step S6, it is determined whether or not the count N of the counter has surpassed any of setpoints N1, N2 and N3 (N3>N2>N1) and, if none has been surpassed, the sequence shifts to step S4. After performing the automatic iris control, the sequence returns to step S2, and it is determined again whether or not the detection signal from the AE detection circuit 29 has varied beyond the prescribed level.

As long as the image sensing ambience does not vary substantially, steps S2-S5-S6-S4 are repeated and, when in the meantime the count N of the counter increases to surpass the setpoint N1, the sequence proceeds from step S6 to step S7. At step S7, the frequency division ratio R of the frequency divider circuit DVD is set to ¼. This results in an alteration of the frequency of the operational clock φv within the signal processing LSI from 6 MHz to 3 MHz, and the frame processing speed is reduced to ½, or 7.5 fps.

Even if the frame processing speed is reduced to ½, unless the detection signal from the AE detection circuit 29 varies beyond the prescribed level, the count N of the timer counter continues to be updated and, if at step S7 the count N is determined to have surpassed the setpoint N2, the sequence proceeds from step S6 to step S8. At step S8, the frequency division ratio R of the frequency divider circuit DVD is further reduced and set to ⅛. This alters the frequency of the operational clock φv within the signal processing LSI from 3 MHz to 1.5 MHz, and the frame processing speed is reduced to ¼, or 3.75 fps.

Further, even if the frame processing speed is reduced to ¼, unless the detection signal from the AE detection circuit 29 varies beyond the prescribed level, the count N of the timer counter continues to be updated and, if at step S6 the count N is determined to have surpassed the setpoint N3, the sequence proceeds from step S6 to step S9. At step S9, the frequency division ratio R of the frequency divider circuit DVD is further reduced and set to ¹⁄₁₆. This alters the frequency of the operational clock φv within the signal processing LSI from 1.5 MHz to 0.75 MHz, and the frame processing speed is reduced to ⅛, or 1.25 fps. As long as the frame speed continues to be reduced, the drop in the frequency of the operational clock φv within the signal processing LSI serves to reduce power consumption.

If on the way of image signal processing with the frame processing speed being reduced as described above the image sensing ambience varies and the detection signal is determined to have varied beyond the prescribed level at step S2, the frequency division ratio R of the frequency divider circuit DVD is returned to the initial ½ at step S3, and at the same time the count N of the timer counter is reset to "0". As this causes the frame processing speed to be returned to 15 fps and the automatic iris control of step S3 to take place, image signals having undergone white balancing and luminance adjustment become available at the normal response speed according to the image sensing ambience.

Figure 5:
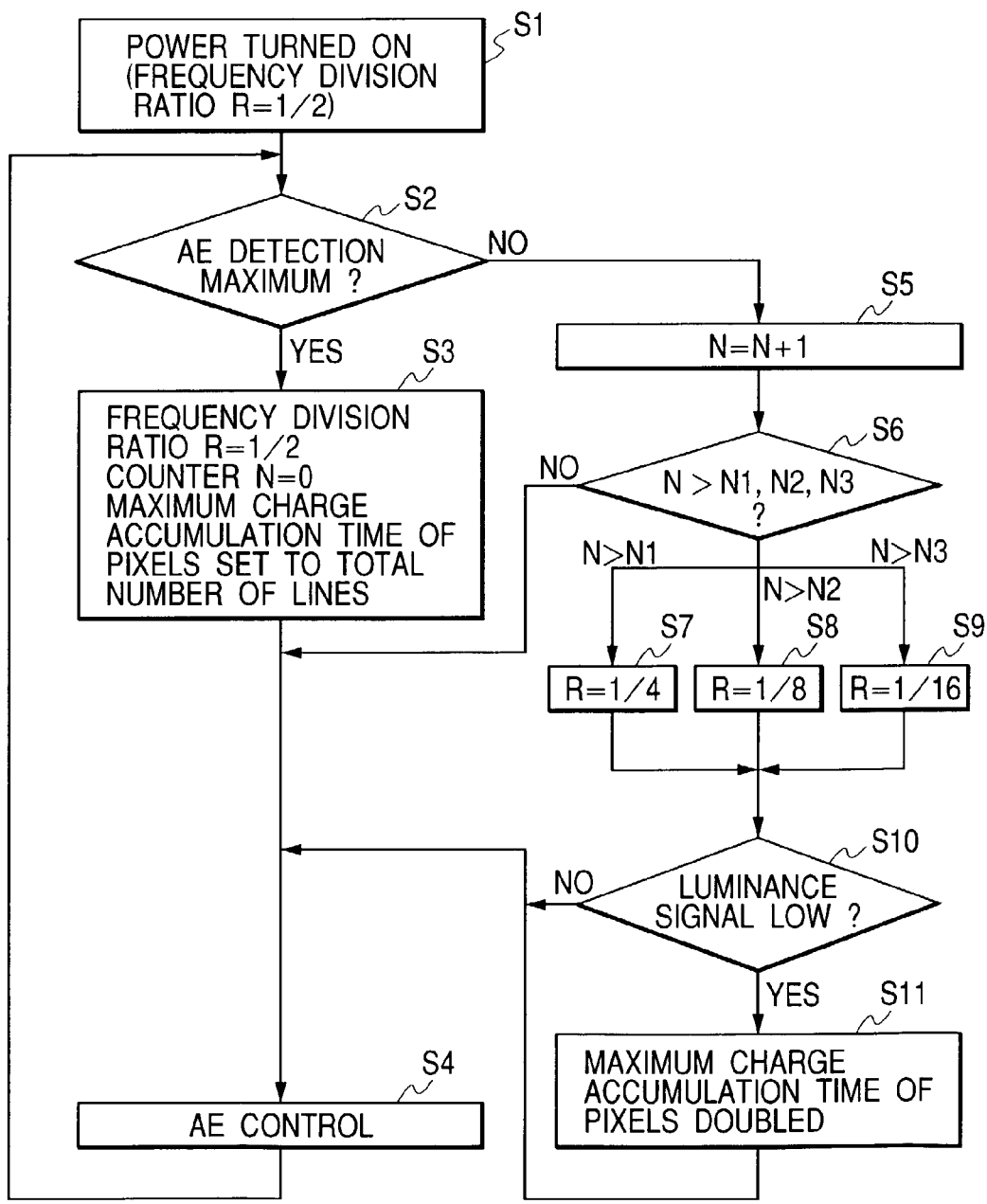
FIG. 5 is a flow chart of an example of control of clock frequency switching and of altering the electric charge accumulation time in the image sensor in the image sensor system embodying the invention.

FIG. 5 is a flow chart showing another example of control by the controller 30. The control flow of this example represents the addition, on the midway of the control flow shown in FIG. 4, of step S10 of determining whether or not the luminance signals are below a certain level and step S11 of rewriting, if the luminance signals are below that level, control data of the control register CRG within the CMOS image sensor 10 to set the maximum charge accumulation time of the pixel to twofold of one frame period, i.e. the total number of lines, at the same time reducing the number of frames outputted to ½ of the normal number, with the setting of the maximum charge accumulation time of the pixel to the total number of lines of the CMOS image sensor being added to step S3 besides the setting of the frequency division ratio R and resetting of the count N of the counter.

Incidentally, since the maximum charge accumulation time of the CMOS image sensor 10 normally is one frame period, i.e. the total number of lines, in order for the control according to this example to be applicable, the system should have a CMOS image sensor 10 which permits setting of the maximum charge accumulation time of each pixel to two frame periods, i.e. double the total number of lines, and a function to reduce the number of frames to ½ of the usual number and to output the frames when the accumulation time is set in this way.

According to the control flow shown in FIG. 5, even where the illuminance of the object is particularly dark, unless there is a major variation in image sensing ambience, step S10 and S11 are executed to operate the CMOS image sensor 10 at a lower than normal frame rate, and this serves to reduce power consumption by the CMOS image sensor 10. Moreover, even if the operating speed of the CMOS image sensor 10 is reduced where the illuminance of image sensing is dark as in this situation and moreover the image sensing ambience varies little, in the image sensor system embodying the invention in this way the circuit for processing image signals from the CMOS image sensor 10 is also slowed in frame processing speed on account of the absence of any major variation in image sensing ambience, the quality of picture does not deteriorate. On the other hand, where the charge accumulation time is double as in the control of this example, the luminance of the image signals can be increased, resulting in the advantage that the display screen can be made about twice as bright.

Figure 6:
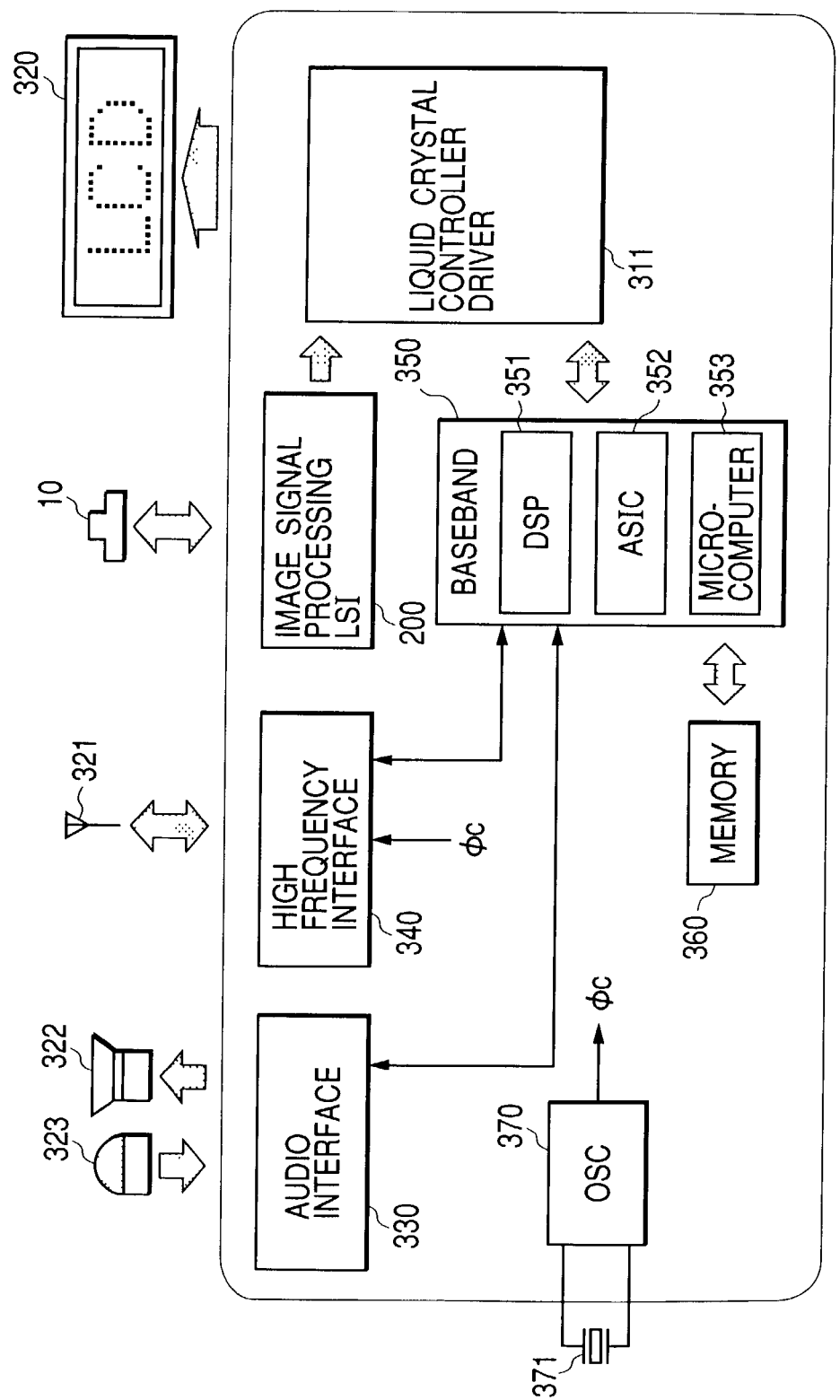
FIG. 6 is a block diagram illustrating the configuration of a mobile telephone to which the image sensor system embodying the invention is applied.

FIG. 6 is a block diagram showing the overall configuration of a mobile telephone to which the image sensor system embodying the invention as described above is applied.

The mobile telephone using this embodiment is provided with the CMOS image sensor 10 as the image sensor, an image signal processing LSI 200 for processing image signals from the image sensor, a liquid crystal panel 320 as the display unit, an antenna 321 for transmission and reception, a loudspeaker 322 for audio outputting, a microphone 323 for audio inputting, a liquid crystal control driver 311 for driving the liquid crystal panel 320 to perform displaying, an audio interface 330 for inputting and outputting signals to and from the loudspeaker 322 and the microphone, a high frequency interface 340 for carrying out mobile telephone communication by the WCDMA system or the like via the antenna 321, a digital signal processor (DSP) 351 for processing audio signals and transmit/receive signals, an application specific integrated circuits (ASIC) 352 providing a customized function (user logic), a system control device 353 consisting of a microprocessor or a microcomputer for controlling the whole apparatus including its communication aspect, a memory 360 for storing data and programs, an oscillator circuit (OSC) 370 for generating a system clock φc and so forth. The DSP 351, the ASIC 352 and the microcomputer 353 as the system control device constitute a baseband circuit 350.

The image signal processing LSI 200 consists of the signal processing circuit 20 and the controller 30 in the embodiment described above configured into an LSI over a single semiconductor substrate. As described above, it is also possible to use a module configured by mounting the image signal processing LSI 200 and the CMOS image sensor 10 over a single printed circuit board. Or it is also possible to use as the image signal processing LSI 200 an LSI in which only the signal processing circuit 20 in the above-described embodiment is integrated, not containing the controller 30, and to have the controller 30 in the above-described embodiment used in coj unction with the microcomputer 353 constituting the baseband circuit 350.

Although the invention by the present inventor has hitherto been described in specific terms with reference to a preferred embodiment thereof, obviously the invention is not confined to the above-described embodiment but can be modified in various ways without deviating from its essentials. For instance, while in the embodiment described above the frequency divider circuit DVD has a register for setting the frequency division ratio and the frequency division ratio is altered by setting the altered ratio with this register, it is also possible to use a configuration in which a control signal for changing over the frequency division ratio of the frequency divider circuit DVD is supplied directly from the controller 30 instead of providing the frequency divider circuit DVD with a register for setting the frequency division ratio.

While the embodiment is described to have a controller 30 configured of a single chip microcomputer, the controller may as well be a dedicated control circuit. In that case, instead of determining any major variation in image signals by programmed processing, a dedicated determination circuit may be provided for hardware processing. Furthermore, instead of determining any variation in image signals on the basis of the quantity of luminance variation or the quantity of white balance adjustment, the determination can be made on the basis of any signal in the color signal processing unit 23 or in the luminance processing unit 24.

While the foregoing description mainly referred to the application by the present inventor to an image sensor system to be mounted on a mobile electronic apparatus, such as a mobile telephone, which constituted the background in considering this technique, the application is not confined to this field, but can also be applied to a video camera for exclusive use in moving images. The invention can as well be extensively applied to electronic apparatuses operating on a battery and having an image sensing function such as PDAs other than mobile telephones and to laptop personal computers.

A typical aspect of the invention disclosed in this application can be briefly described as follows. Thus, an image sensor system using a CMOS image sensor according to the invention can reduce the frame processing speed and thereby save power consumption without sacrificing the image quality, because it monitors variations in image sensing ambience, gradually reduces the frame processing speed when the image sensing ambience varies little, and returns the frame processing speed to the normal level when the image sensing ambience varies to a greater extent. Especially where it is applied to a mobile electronic apparatus operating on a battery, such as a mobile telephone, it can reduce the frame processing speed and thereby save power consumption without sacrificing image quality because the CMOS image sensor, which consumes less power than the CMOS image sensor and controls the frame processing speed according to variations in image sensing ambience. As a result, there is provided the advantage of extending the duration of operability with one process of charging.

What is claimed is:

1. An image sensor system comprising a CMOS image sensor and a signal processing LSI for processing image signals from the CMOS image sensor,
   wherein said signal processing LSI reduces the frequency of an operational clock within the signal processing LSI when the variation in image signals from said CMOS image sensor is less than a prescribed level.

2. The image sensor system according to claim 1, wherein said signal processing LSI separates image signals from said CMOS image sensor into color signals and luminance signals, and reduces the frequency of the operational clock within the signal processing LSI when the variation in the separated luminance signals is less than a prescribed level.

3. The image sensor system according to claim 1, wherein said signal processing LSI separates image signals from said CMOS image sensor into color signals and luminance signals, and reduces the frequency of the operational clock within the signal processing LSI when the variation in either the separated luminance signals or color signals is less than a prescribed level.

4. The image sensor system according to claim 1, wherein said signal processing LSI separates image signals from said CMOS image sensor into color signals and luminance signals, and reduces the frequency of the operational clock within the signal processing LSI when the variations in the separated luminance signals and color signals are less than respectively prescribed levels.

5. The image sensor system according to claim 1, wherein said signal processing LSI comprises: a signal separation circuit for separating image signals supplied from said CMOS image sensor into color signals and luminance signals; a luminance correction circuit for correcting the separated luminance signals; a color correction circuit for correcting the separated color signals; a first detection circuit for detecting the quantity of correction in said luminance correction circuit; and a control circuit for controlling the signal processing LSI and said CMOS image sensor, wherein the control circuit reduces the frequency of the operational clock within the signal processing LSI when the variation in image signals is less than a prescribed level according to a detection signal from said first detection circuit.

6. The image sensor system according to claim 5, wherein said signal processing LSI further comprises a second detection circuit for detecting the quantity of correction in said color correction circuit, and said control circuit reduces the frequency of the operational clock within the signal processing LSI when the variation in the luminance content of image signals is less than a prescribed level or the variation in the color content of image signals is less than a prescribed level based on the detection signal from said first detection circuit and a detection signal from said second detection circuit.

7. The image sensor system according to claim 5, wherein said control circuit comprises a data processing unit for performing control by executing a programmed command and a memory for storing the program to be executed by the data processing unit, and the control to reduce the frequency of said operational clock is carried out by program processing by said data processing unit.

8. The image sensor system according to claim 5, further comprising a frequency divider circuit capable of dividing the frequency of a reference clock signal into a plurality of steps, wherein said control circuit reduces the frequency of said operational clock by varying the frequency division ratio of said frequency divider circuit.

9. The image sensor system according to claim 1,
   wherein said CMOS image sensor is configured to be able to set the maximum charge accumulation time of each pixel to a longer length of time than the length of time required to scan every horizontal scanning line in a full round,
   wherein the maximum charge accumulation time of said CMOS image sensor is set, during a prescribed operation, to a shorter length of time than the length of time required to scan every horizontal scanning line in a full round, and
   wherein the maximum charge accumulation time of said CMOS image sensor is set, in a state in which said control circuit is performing control to reduce the frequency of said operational clock and said luminance signal or luminance content is less than a prescribed level, to a longer length of time than the length of time required to scan every horizontal scanning line in a full round.

10. The image sensor system according to claim 9, wherein said maximum charge accumulation time is set by said control circuit by setting into the CMOS image sensor.

11. An image sensor apparatus comprising: a first semiconductor chip in which a CMOS image sensor is formed; and a second semiconductor chip in which an image signal processing circuit for processing image signals outputted from said CMOS image sensor and a control circuit for controlling said CMOS image sensor and image signal processing circuit are formed, both chips being mounted over a single printed circuit board,
wherein the frequency of the operational clock within said image signal processing circuit is reduced when said control circuit determines that the variation in image signals from said CMOS image sensor is less than a prescribed level.

12. The image sensor apparatus using a CMOS image sensor according to claim 11, wherein said control circuit comprises: a data processing unit for performing control by executing a programmed command; and a memory for storing the program to be executed by the data processing unit, and the control to reduce the frequency of said operational clock is carried out by program processing by said data processing unit.

13. An image sensor apparatus comprising: a first semiconductor chip in which a CMOS image sensor is formed; a second semiconductor chip in which an image signal processing circuit for processing image signals outputted from said CMOS image sensor is formed; and a third semiconductor chip in which a control circuit for controlling said CMOS image sensor and image signal processing circuit are formed, all these chips being mounted over a single printed circuit board,
wherein the frequency of the operational clock within said image signal processing circuit is reduced when said control circuit determines that the variation in image signals from said CMOS image sensor is less than a prescribed level.

* * * * *

UNITED STATES PATENT AND TRADEMARK OFFICE
CERTIFICATE OF CORRECTION

PATENT NO. : 7,230,649 B2
APPLICATION NO. : 10/291531
DATED : June 12, 2007
INVENTOR(S) : Takashi Takahashi et al.

It is certified that error appears in the above-identified patent and that said Letters Patent is hereby corrected as shown below:

On the Title Page:

Item (75) should read as follows:

(75) Inventors: Takashi Takahashi, Takasaki (JP)
Hiroyuki Matsumoto, Takasaki (JP)
Teruaki Odaka, Takasaki (JP)
Masashi Nakamura, Takasaki (JP)
Koji Shida, Takasaki (JP)

Signed and Sealed this

Twenty-seventh Day of November, 2007

JON W. DUDAS
*Director of the United States Patent and Trademark Office*